US009066089B2

(12) United States Patent
Ohmi

(10) Patent No.: US 9,066,089 B2
(45) Date of Patent: Jun. 23, 2015

(54) STEREOSCOPIC IMAGE DISPLAY DEVICE AND STEREOSCOPIC IMAGE DISPLAY METHOD

(71) Applicant: PANASONIC CORPORATION, Osaka (JP)

(72) Inventor: Shinichiro Ohmi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 371 days.

(21) Appl. No.: 13/744,070

(22) Filed: Jan. 17, 2013

(65) Prior Publication Data

US 2013/0208099 A1    Aug. 15, 2013

Related U.S. Application Data

(63) Continuation of application No. PCT/JP2012/003479, filed on May 28, 2012.

(30) Foreign Application Priority Data

Feb. 15, 2012    (JP) ................................ 2012-030279

(51) Int. Cl.
*H04N 13/04* (2006.01)
*H04N 15/00* (2006.01)

(52) U.S. Cl.
CPC ....... *H04N 13/0409* (2013.01); *H04N 13/0413* (2013.01); *H04N 13/0468* (2013.01); *H04N 13/0479* (2013.01)

(58) Field of Classification Search
CPC ............... G02B 27/2214; G02B 27/26; H04N 13/0404; H04N 13/0434; H04N 13/0409; H04N 13/0418; H04N 13/0422

USPC .............................................. 348/54; 349/15
See application file for complete search history.

(56) References Cited

U.S. PATENT DOCUMENTS 8,884,998 B2 *   11/2014   Yang et al. ................... 345/690
2003/0025995 A1   2/2003   Redert et al.
(Continued)

FOREIGN PATENT DOCUMENTS

GB    2415849 A    1/2006
GB    2415850 A    1/2006
(Continued)

OTHER PUBLICATIONS

International Search Report mailed Jul. 24, 2012 issued in corresponding International Application No. PCT/JP2012/003479.

*Primary Examiner* — Sath V Perungavoor
*Assistant Examiner* — Howard D Brown, Jr.
(74) *Attorney, Agent, or Firm* — McDermott Will & Emery LLP

(57) ABSTRACT

A 3D tablet includes: a parallax image display unit which displays a stereoscopic image including a right-eye image and a left-eye image, between which there is parallax; a parallax barrier display unit which displays a parallax barrier having a stripe pattern and superimposed on the parallax image display unit to show the right-eye image and the left-eye image to a right and left eye of a user, respectively; a user position detection unit which obtains an orientation of the user relative to the parallax image display unit; a direction calculation and control unit which substantially collimates a longitudinal direction of the stripe pattern of the parallax barrier with the orientation of the user; and a parallax image generation unit which generates and displays, using the parallax image display unit, the stereoscopic image in which there is parallax in a direction substantially perpendicular to the orientation of the user.

10 Claims, 17 Drawing Sheets

(56) References Cited

U.S. PATENT DOCUMENTS

| | | | |
|---|---|---|---|
| 2004/0008251 A1* | 1/2004 | Mashitani et al. | 348/51 |
| 2005/0225502 A1* | 10/2005 | Nam et al. | 345/55 |
| 2006/0126177 A1 | 6/2006 | Kim et al. | |
| 2006/0170833 A1* | 8/2006 | Lin et al. | 349/15 |
| 2008/0030634 A1* | 2/2008 | Aramatsu | 349/15 |
| 2008/0259233 A1 | 10/2008 | Krijn et al. | |
| 2010/0171697 A1 | 7/2010 | Son et al. | |
| 2010/0253766 A1 | 10/2010 | Mann et al. | |
| 2011/0102423 A1 | 5/2011 | Nam et al. | |
| 2011/0316985 A1* | 12/2011 | Ishikawa et al. | 348/51 |
| 2012/0127572 A1* | 5/2012 | Takahashi et al. | 359/463 |
| 2012/0162762 A1* | 6/2012 | Takahashi | 359/462 |
| 2012/0242569 A1* | 9/2012 | Hamagishi | 345/156 |
| 2013/0162691 A1* | 6/2013 | Yang et al. | 345/690 |

FOREIGN PATENT DOCUMENTS

| | | |
|---|---|---|
| JP | 09-159970 A | 6/1997 |
| JP | 2004-537933 A | 12/2004 |
| JP | 2005-122020 A | 5/2005 |
| JP | 2006-018282 A | 1/2006 |
| JP | 2006-154809 A | 6/2006 |
| JP | 2009-520232 A | 5/2009 |
| JP | 2011-101366 A | 5/2011 |
| JP | 2011-205195 A | 10/2011 |
| JP | 2012-023557 A | 2/2012 |
| WO | WO-03/013153 A1 | 2/2003 |
| WO | WO-2007/072330 A1 | 6/2007 |

* cited by examiner

901

902

1000  1001  1000

1003
1002
1003

STEREOSCOPIC IMAGE DISPLAY DEVICE AND STEREOSCOPIC IMAGE DISPLAY METHOD

CROSS REFERENCE TO RELATED APPLICATION(S)

This is a continuation application of PCT International Application No. PCT/JP2012/003479 filed on May 28, 2012, designating the United States of America, which is based on and claims priority of Japanese Patent Application No. 2012-030279 filed on Feb. 15, 2012. The entire disclosures of the above-identified applications, including the specifications, drawings and claims are incorporated herein by reference in their entirety.

FIELD

The present disclosure relates to a stereoscopic image display device for displaying objects stereoscopically.

BACKGROUND

The 3D mobile market has expanded at a rapid pace in recent years. It is estimated that autostereoscopic 3D devices account for approximately 12% of this market. It is further estimated that the number of autostereoscopic 3D mobile devices will increase by 130 million from 2011 through 2015, where it is believed that autostereoscopic 3D technology will continue to be adopted for use in tablets, which have a strong outlook.

In addition to tablets designed for handheld use, some tablets will be designed to be used while placed flat as tablet sizes increase. When placed flat, the number of angles from which the autostereoscopic 3D display is viewed increases.

Patent Literature 1 discloses a technology related to a multi-view 3D display viewable from a first direction and from a second direction.

CITATION LIST

Patent Literature

[PTL 1] Japanese Unexamined Patent Application Publication No. 2006-018282

SUMMARY

Technical Problem

When an autostereoscopic 3D display employing a parallax barrier is placed down flat and rotated such that the display is viewed diagonally, a problem arises in which the parallax images appear to be overlapping, thereby inhibiting stereoscopic viewing thereof.

The present disclosure has been made in view of the above problem, and provides a stereoscopic image display device capable of producing an image which can be viewed stereoscopically even when the viewing direction changes.

Solution to Problem

The stereoscopic image display device according to an embodiment of the present disclosure includes: a display unit configured to display a stereoscopic image including a right-eye image and a left-eye image, between which there is parallax; a parallax barrier having a stripe pattern and superimposed on the display unit to show the right-eye image to a right eye of a user and the left-eye image to a left eye of the user; an obtaining unit configured to obtain an orientation of the user relative to the display unit; a control unit configured to substantially collimate a longitudinal direction of the stripe pattern of the parallax barrier with the orientation of the user obtained by the obtaining unit; and a generation unit configured to generate and display, using the display unit, the stereoscopic image including the right-eye image and the left-eye image, between which there is parallax in a direction substantially perpendicular to the orientation of the user obtained by the obtaining unit.

It is to be noted that general or specific embodiments may be realized as a system, method, integrated circuit, computer program, storage media, or any elective combination thereof.

Advantageous Effects

With the present disclosure, by continuously and optimally controlling the direction in which the stripes of the parallax barrier extend, a stereoscopic image display device can be realized which is capable of continuously and stably producing an image which can be viewed stereoscopically even when the relative position of the 3D display and both eyes changes.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Figure 1:
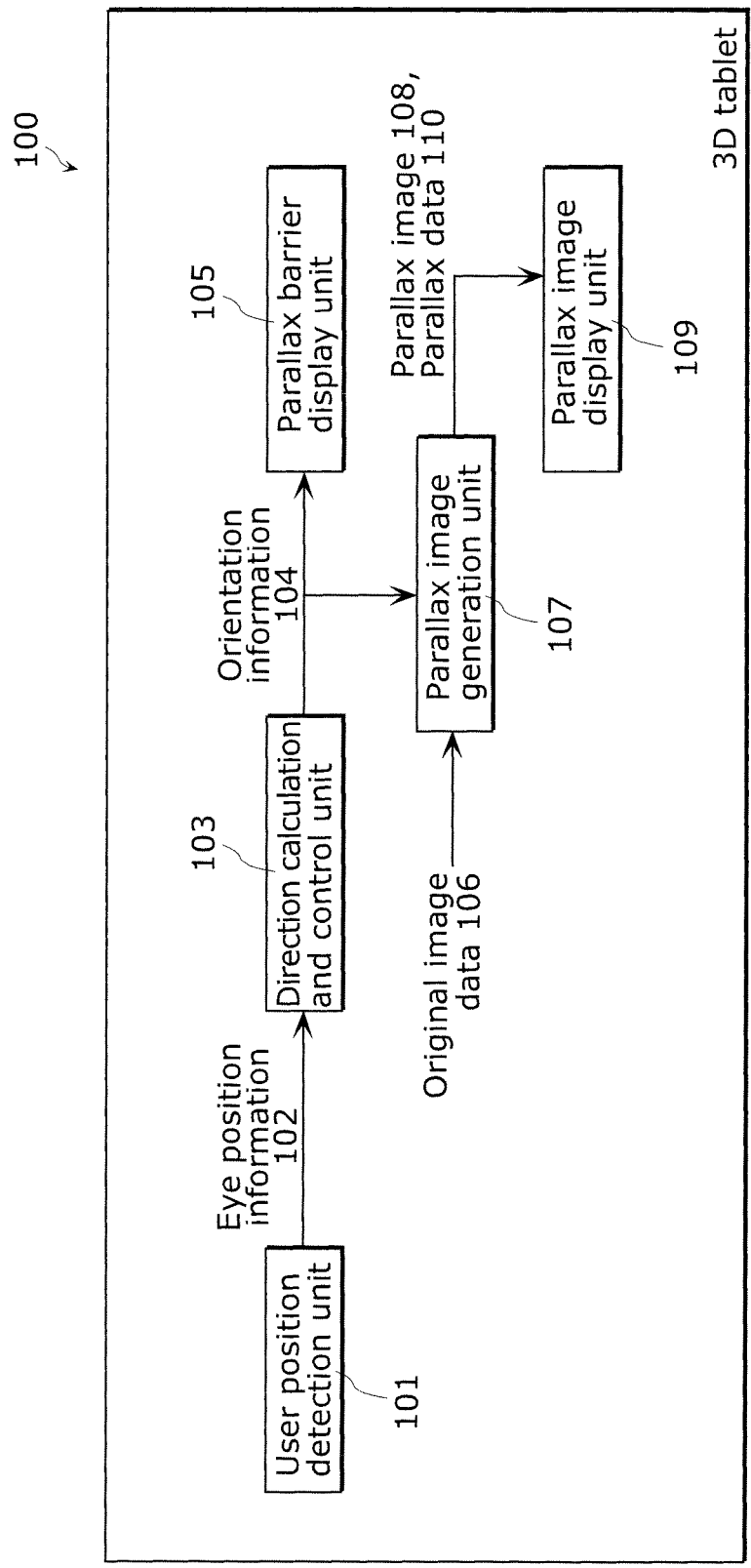
FIG. 1 is a function block diagram of a 3D tablet according to this embodiment.

The stereoscopic image display device according to an embodiment of the present disclosure includes: a display unit configured to display a stereoscopic image including a right-eye image and a left-eye image, between which there is parallax; a parallax barrier having a stripe pattern and superimposed on the display unit to show the right-eye image to a right eye of a user and the left-eye image to a left eye of the user; an obtaining unit configured to obtain an orientation of the user relative to the display unit; a control unit configured to substantially collimate a longitudinal direction of the stripe pattern of the parallax barrier with the orientation of the user obtained by the obtaining unit; and a generation unit configured to generate and display, using the display unit, the stereoscopic image including the right-eye image and the left-eye image, between which there is parallax in a direction substantially perpendicular to the orientation of the user obtained by the obtaining unit.

The stereoscopic image display device according to another embodiment of the present disclosure includes: a display unit configured to display a stereoscopic image including a right-eye image and a left-eye image, between which there is parallax; a parallax barrier having a stripe pattern and superimposed on the display unit to show the right-eye image to a right eye of a user and the left-eye image to a left eye of the user; an obtaining unit configured to obtain an orientation of the user relative to the display unit; a control unit configured to substantially collimate a longitudinal direction of the stripe pattern of the parallax barrier with the orientation of the user obtained by the obtaining unit; and a generation unit configured to generate and display, using the display unit, the stereoscopic image including the right-eye image and the left-eye image, between which there is parallax in a direction substantially perpendicular to the longitudinal direction of the stripe pattern of the parallax barrier substantially collimated to the orientation of the user by the control unit.

With the above configuration, by continuously and optimally controlling the direction in which the stripes of the parallax barrier extend, a stereoscopic image display device can be realized which is capable of continuously and stably producing an image which can be viewed stereoscopically even when the relative position of the display unit and both eyes changes.

Moreover, the obtaining unit may be configured to obtain, as the orientation of the user, a direction in a plane including the display unit and parallel to a direction perpendicular to a virtual line connecting the eyes of the user.

Furthermore, the obtaining unit may be configured to obtain an interpupillary distance of the user. The generation unit may then be configured to adjust an amount of parallax between the right-eye image and the left-eye image according to the interpupillary distance obtained by the obtaining unit.

For example, the obtaining unit may include an image capturing unit configured to capture an image of the user, and the obtaining unit may be configured to derive the orientation of the user from the image captured by the image capturing unit.

Furthermore, the obtaining unit may include an input unit configured to receive an input of information specifying a position of the user, and the obtaining unit may be configured to derive the orientation of the user based on the information received by the input unit.

For example, each pixel of the display unit may include a plurality of subpixels. Boundaries between the subpixels may extend in a diagonal direction relative to boundaries between adjacent ones of the pixels.

For example, the display unit may include a plurality of display regions. The obtaining unit may be configured to obtain the orientation of the user relative to each of the display regions. The control unit may be configured to substantially collimate the longitudinal direction of the stripe pattern of the parallax barrier for each of the display regions with the orientation of the user. The generation unit may be configured to generate and display, for each of the display regions, the stereoscopic image including the right-eye image and the left-eye image, between which there is parallax in a direction substantially perpendicular to the orientation of the user obtained by the obtaining unit.

Furthermore, the obtaining unit may be configured to obtain an angle of elevation of the user with respect to a display surface of the display unit. The generation unit may then be configured to generate and display, using the display unit, the stereoscopic image of an object as observed from the angle of elevation of the user obtained by the obtaining unit.

The stereoscopic image display according to an aspect of the present disclosure is a method of displaying a stereoscopic image on a stereoscopic image display device including a display unit configured to display the stereoscopic image including a right-eye image and a left-eye image, between which there is parallax, and a parallax barrier having a stripe pattern and superimposed on the display unit to show the right-eye image to a right eye of a user and the left-eye image to a left eye of the user, the method including: obtaining an orientation of the user relative to the display unit; substantially collimating a longitudinal direction of the stripe pattern of the parallax barrier with the orientation of the user obtained in the obtaining; and generating and displaying, using the display unit, the stereoscopic image including the right-eye image and the left-eye image, between which there is parallax in a direction substantially perpendicular to the orientation of the user obtained in the obtaining.

The stereoscopic image display according to an aspect of the present disclosure is a method of displaying a stereoscopic image on a stereoscopic image display device including a display unit configured to display the stereoscopic image including a right-eye image and a left-eye image, between which there is parallax, and a parallax barrier having a stripe pattern and superimposed on the display unit to show the right-eye image to a right eye of a user and the left-eye image to a left eye of the user, the method including: obtaining an orientation of the user relative to the display unit; substantially collimating a longitudinal direction of the stripe pattern of the parallax barrier with the orientation of the user obtained in the obtaining; and generating and displaying, using the display unit, the stereoscopic image including the right-eye image and the left-eye image, between which there is parallax in a direction substantially perpendicular to the longitudinal direction of the stripe pattern of the parallax barrier substantially collimated to the orientation of the user in the substantially collimating.

It is to be noted that general or specific embodiments may be realized as a system, method, integrated circuit, computer program, storage media, or any elective combination thereof.

Hereinafter, a 3D tablet, which is an example of the stereoscopic image display device according to the embodiment of present disclosure, is described with reference to the drawings. It is to be noted that the embodiment described below shows a specific example of the present disclosure. The numerical values, shapes, materials, structural elements, the arrangement and connection of the structural elements, steps, the processing order of the steps etc. shown in the following exemplary embodiment are mere examples, and therefore do not limit the present disclosure. Moreover, among the structural elements in the following exemplary embodiment, structural elements not recited in any one of the independent claims defining the most generic part of the inventive concept are described as arbitrary structural elements.

Embodiment

Figure 2:
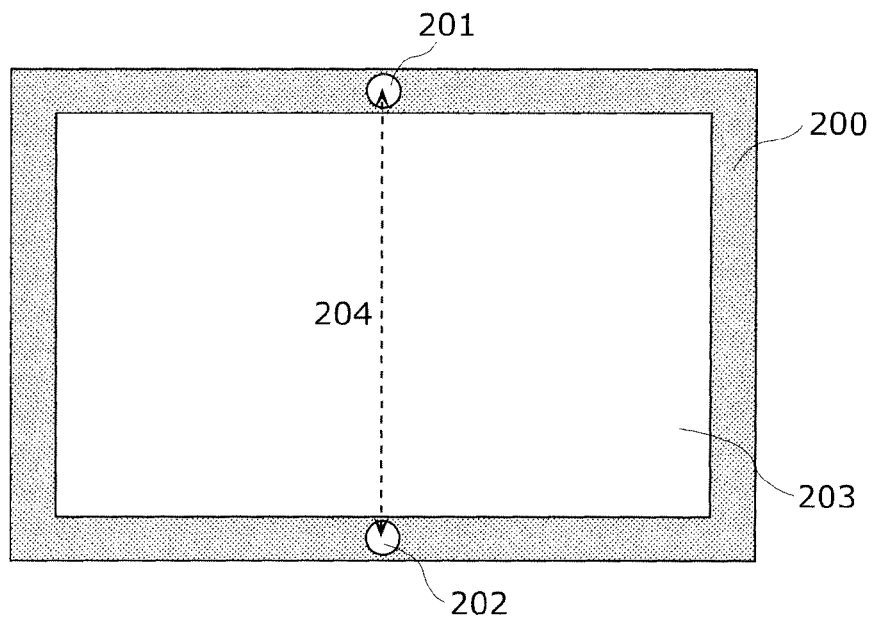
FIG. 2 is an external view of the 3D tablet according to this embodiment.

FIG. 1 is a function block diagram of a 3D tablet 100 according to this embodiment. FIG. 2 is an external view of a 3D tablet 200 according to this embodiment.

As is shown in FIG. 1, the 3D tablet 100 includes a user position detection unit 101, a direction calculation and control unit 103, a parallax barrier display unit 105, a parallax image generation unit 107, and a parallax image display unit 109.

First, the user position detection unit (detection unit) 101 calculates coordinates of locations in space (spatial location coordinates) of a user's right eye and left eye from an imaged obtained from an image capturing unit (cameras 201 and 202 shown in FIG. 2). Then, the user position detection unit 101 outputs the spatial location coordinates of the user's right eye and left eye to the direction calculation and control unit 103 as eye position information 102.

The direction calculation and control unit (control unit) 103 obtains the eye position information 102 from the user position detection unit 101, and, as previously described, calculates the orientation of the user relative to the parallax image display unit 109 of the 3D tablet 100 from the eye position information 102. The direction calculation and control unit 103 then outputs the calculated orientation of the user to the parallax barrier display unit 105 and the parallax image generation unit 107 as orientation information 104 (equivalent to a target angle 1503 to be described later).

It is to be noted that the orientation of the user relative to the display of the 3D tablet 100 is information specifying the position of the user relative to the 3D tablet 100, and is, for example, a direction of a virtual line connecting a user and the 3D tablet 100 in a plane including the display surface of the parallax image display unit 109, and typically is a direction parallel to a direction perpendicular to a virtual line connecting the eyes of a user looking at the 3D tablet 100 (target angle 1503, to be described later). In other words, the orientation of the user and the direction of the virtual line connecting both eyes of the user are located in a skew position.

The parallax barrier display unit (parallax barrier) 105 is superimposed on the parallax image display unit 109 and displays a parallax barrier in a stripe pattern. In order to show the right-eye image displayed on the parallax image display unit 109 to the right eye of the user and the left-eye image displayed on the parallax image display unit 109 to the left eye of the user, the parallax barrier controls the switching of a plurality of liquid crystal elements arranged in matrix between a shielding state (ON) and a transparent state (OFF).

The parallax barrier display unit 105 obtains the orientation information 104 from the direction calculation and control unit 103 and controls the ON/OFF state of the stripe pattern of the liquid crystal elements in the parallax barrier such that the stripes extend in a direction substantially parallel to the orientation of the user as obtained from the orientation information 104.

Additionally, the parallax image generation unit (generation unit) 107 obtains the orientation information 104 from the direction calculation and control unit 103 and obtains original image data 106 from an external source. The parallax image generation unit 107 then calculates and outputs, to the parallax image display unit 109, (i) a parallax image 108 in which there is parallax in a direction substantially perpendicular to the orientation of the user as obtained from the orientation information 104, and (ii) parallax data 110 including a parallax amount and the alignment of the parallax image 108. The parallax image 108 a stereoscopic image made by combining a parallax right-eye image and a parallax left-eye image.

It is to be noted that in the example shown in FIG. 1, the parallax barrier display unit 105 uses the orientation information 104 obtained from the direction calculation and control unit 103 to determine the direction in which the stripes of the parallax barrier extend. Similarly, the parallax image generation unit 107 uses the orientation information 104 obtained from the direction calculation and control unit 103 to determine the direction of the parallax. However, as long as the result of the operation of each function block is that the orientation of the user and the direction in which the stripes of the parallax barrier extend are substantially parallel and the orientation of the user and the direction of the parallax are substantially perpendicular (that is to say, the direction in which the stripes of the parallax barrier extend and the direction of the parallax are substantially perpendicular), the type of information used for processing by each function block is not intended to be limiting.

As an alternate example, the parallax barrier display unit 105 may, similar to above, determine the direction in which the stripes of the parallax barrier extend using the orientation information 104, and report the determined direction to the parallax image generation unit 107. The parallax image generation unit 107 may then calculate, using the direction in which the stripes of the parallax barrier extend obtained from the parallax barrier display unit 105, the parallax data 110 and the parallax image 108 in which there is parallax in a direction substantially perpendicular to the direction in which the stripes of the parallax barrier extend (that is to say, substantially perpendicular to the orientation of the user).

As another alternate example, the parallax image generation unit 107 may, similar to above, determine the direction of the parallax using the orientation information 104, and report the determined parallax direction to the parallax barrier display unit 105. The parallax barrier display unit 105 then, using the parallax direction obtained from the parallax image generation unit 107, may display the parallax barrier such that the direction in which the stripes of the parallax barrier extend is substantially perpendicular to the parallax direction (that is to say, such that the direction in which the stripes of the parallax barrier extend is substantially parallel to the orientation of the user).

It is to be noted that the interpupillary distance of the user used in the calculation of the parallax data 110 may be calculated, for example, from the eye position information 102, may be received as an input of an interpupillary distance or the like made by a user by an input unit (not shown in the drawings), or may be an average adult interpupillary distance (typically 6 cm).

The parallax image display unit 109 obtains the parallax image 108 and the parallax data 110 from the parallax image generation unit 107 and displays the parallax image (stereoscopic image) 108 according to the alignment of the parallax image 108 and the parallax amount indicated in the parallax data 110, as previously described. Specific details regarding the structure of the parallax image display unit 109 are not particularly limited. For example, a liquid crystal display (LCD), plasma display, or an organic electroluminescent display may be used.

Next, the relationship between the user orientation, parallax barrier direction, and parallax direction of the stereoscopic image with respect to the 3D tablet according to this embodiment will be explained with reference to FIG. 3A and FIG. 3B.

Figure 3A:
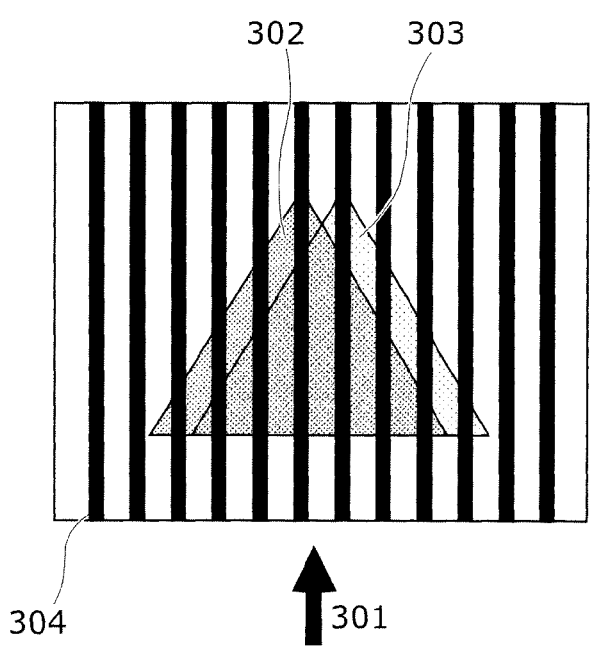
FIG. 3A illustrates an example of a relationship between the user orientation, parallax barrier direction, and parallax direction of the stereoscopic image with respect to the 3D tablet according to this embodiment.

When the orientation of an arrow 301 shown in FIG. 3A (bottom of the 3D tablet relative to the image shown in FIG. 3A) is calculated by the direction calculation and control unit 103, the parallax barrier display unit 105 displays a parallax barrier 304 such that the direction in which the stripes of the parallax barrier extend is parallel to the orientation of the arrow 301 (that is to say, the stripes of the parallax barrier extend in a vertical direction). Moreover, the parallax image generation unit 107 generates a left-eye image 302 and a right-eye image 303 such that the direction of parallax is perpendicular to the arrow 301 (that is to say, such that the parallax is generated in a horizontal direction), and displays the result on the parallax image display unit 109.

Figure 3B:
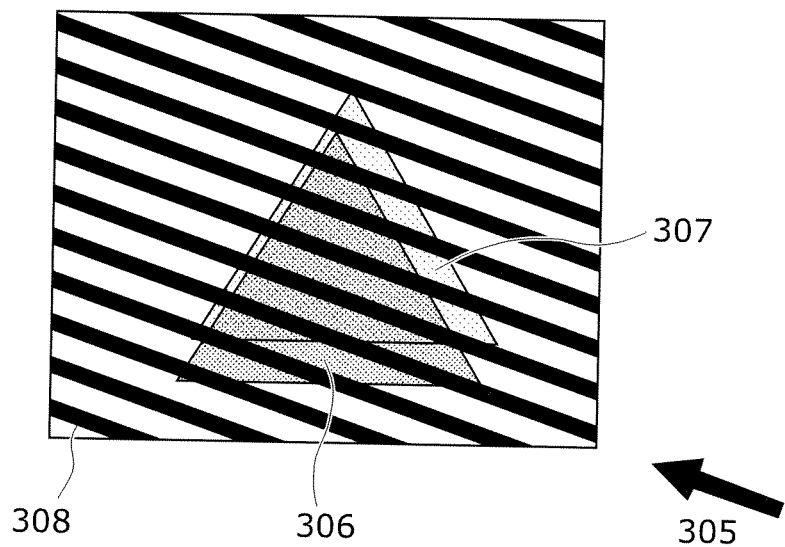
FIG. 3B illustrates another example of a relationship between the user orientation, parallax barrier direction, and parallax direction of the stereoscopic image with respect to the 3D tablet according to this embodiment.

Similarly, when the orientation of an arrow 305 shown in FIG. 3B (bottom-right of the 3D tablet relative to the image shown in FIG. 3B) is calculated by the direction calculation and control unit 103, the parallax barrier display unit 105 displays a parallax barrier 308 such that the direction in which the stripes of the parallax barrier extend is parallel to the orientation of the arrow 305 (that is to say, the stripes of the parallax barrier extend in a top-left to bottom-right direction). Moreover, the parallax image generation unit 107 generates a left-eye image 306 and a right-eye image 307 such that the direction of parallax is perpendicular to the arrow 305 (that is to say, such that the parallax is generated in a bottom-left to top-right direction), and displays the result on the parallax image display unit 109.

It is to be noted that the arrow 301 shown in FIG. 3A represents a direction perpendicular to a virtual line connecting both eyes of the user. That is to say, the direction calculation and control unit 103 may calculate a direction of a virtual line connecting both eyes of the user based on the eye position information 102 detected by the user position detection unit 101. The parallax barrier display unit 105 may then display the parallax barrier 304 such that the direction in which the stripes of the parallax barrier extend is parallel to a direction perpendicular to the direction of the virtual line. Moreover, the parallax image generation unit 107 may generate the left-eye image 302 and the right-eye image 303 such that the direction of parallax is parallel to the direction of the virtual line, and display the result on the parallax image display unit 109. The same holds true for the example shown in FIG. 3B.

Moreover, the direction calculation and control unit 103 may further calculate the interpupillary distance of the user. The parallax image generation unit 107 may then adjust the parallax amount between the right-eye image 302 and the left-eye image 303 according to the interpupillary distance calculated by the direction calculation and control unit 103. The same holds true for the example shown in FIG. 3B.

Furthermore, in FIG. 3A, the direction in which the stripes of the parallax barrier 304 extend is not required to be exactly parallel to the direction of the arrow 301. A slight a margin of error is allowed. In other words, it is acceptable as long as the stripes of the parallax barrier 304 extend in a direction substantially parallel to the direction of the arrow 301. The same holds true for the example shown in FIG. 3B.

Figure 7A:
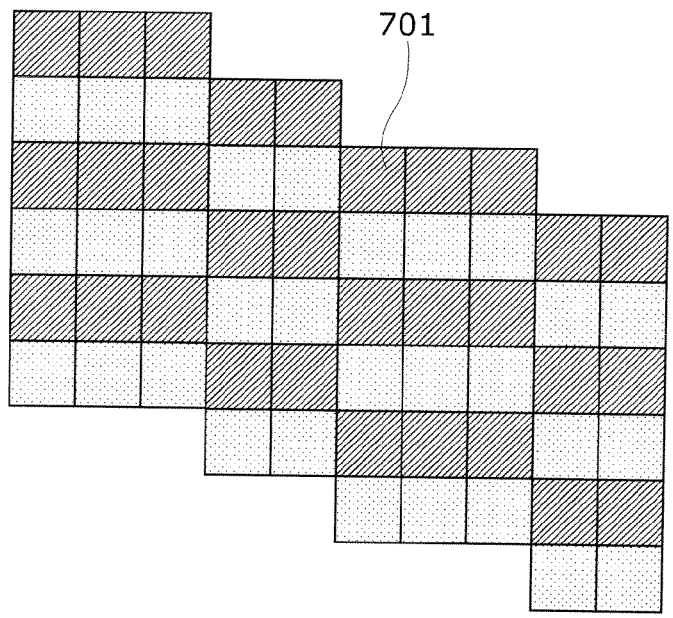
FIG. 7A is an example of a pixel set in the display.
Figure 7B:
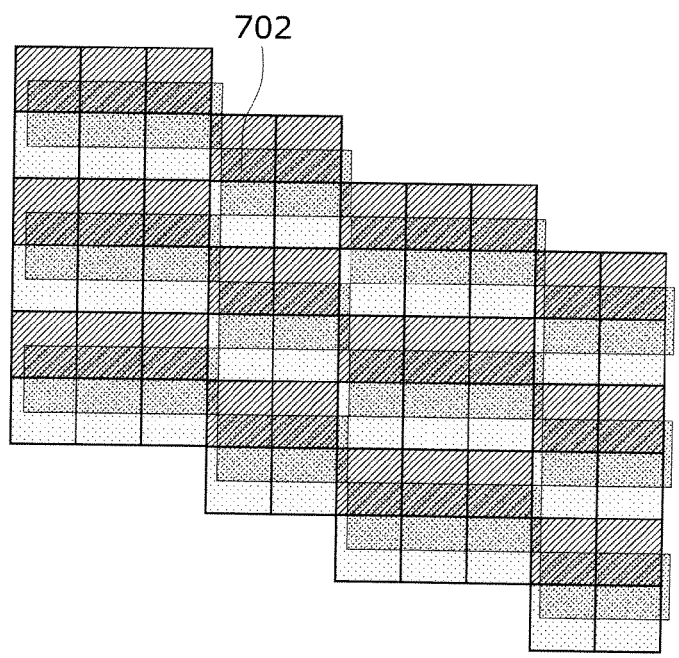
FIG. 7B illustrates the superimposition of the parallax barrier on the display shown in FIG. 7A.
Figure 8A:
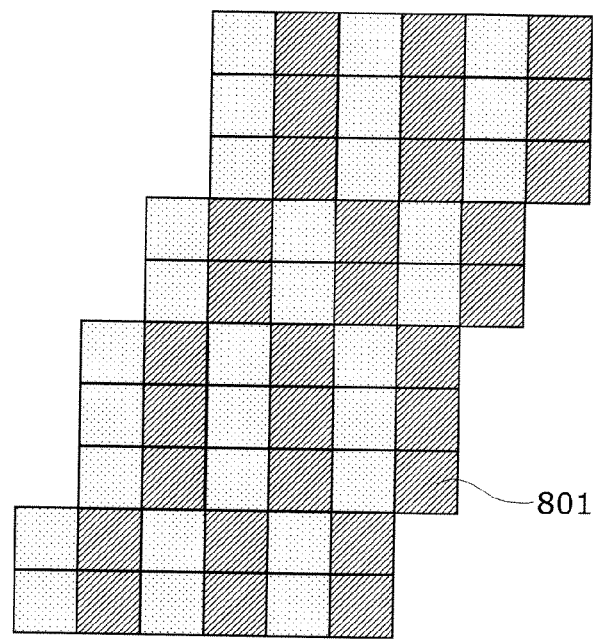
FIG. 8A is another example of a pixel set in the display.
Figure 8B:
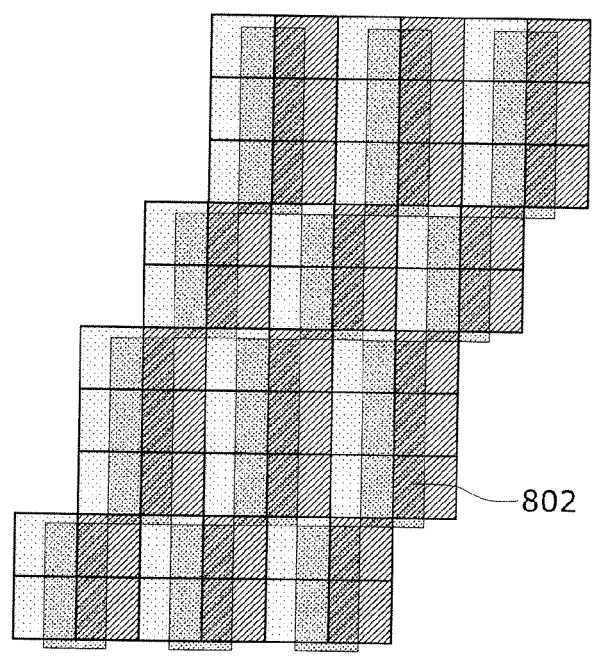
FIG. 8B illustrates the superimposition of the parallax barrier on the display shown in FIG. 8A.

The parallax barrier 304 is, for example, realized by switching liquid crystal elements arranged in a matrix (liquid crystal matrix) between ON and OFF states, as is shown in FIG. 7B and FIG. 8B. The parallax barrier display unit 105 may then, for example, select a parallax barrier stripe direction from among the directions achievable by the barrier stripes with the above-described method that is closest to a direction parallel to the orientation of the user. The relationship between the parallax barrier stripe direction and the orientation of the user achieved with the above-described processes is intended to be included within the definition of "substantially parallel".

Similarly, the parallax direction of the left-eye image 302 and the right-eye image 303 is not required to be exactly perpendicular to the direction of the arrow 301. A slight margin of error is allowed. In other words, it is acceptable as long as the left-eye image 302 and the right-eye image 303 in which there is parallax in a direction substantially perpendicular to the direction of the arrow 301 are generated and displayed. The same holds true for the example shown in FIG. 3B.

The parallax direction, that is to say, the pixel set orientation (to be described later), is realized, for example, as a combination of a plurality of pixels arranged in a matrix, as is shown in FIG. 7A and FIG. 8A. The parallax image generation unit 107 may then, for example, select, from among the combinations of the pixel set achievable with the above-described method, a combination having a direction that is closest to a direction perpendicular to the orientation of the user. The relationship between the parallax direction and the orientation of the user achieved with the above-described processes is intended to be included within the definition of "substantially perpendicular".

With this chain of operation, the parallax barrier and the parallax image can be controlled according to the viewing position of the user. Consequently, a stereoscopic object can be stereoscopically viewed when the user views the image displayed on the parallax image display unit 109, regardless of the direction of viewing.

It is to be noted that the 3D tablet 200 shown in FIG. 2 includes, for example, a 10.1 inch (1366×768 pixels) autostereoscopic 3D display 203 and a pair of cameras 201 and 202 constituting a stereo camera. It is to be noted that the pair of cameras 201 and 202 shown in FIG. 2 have an inter-camera distance 204 of 130 mm.

However, the specific structure of the 3D tablet 200 is not limited to the structure shown in FIG. 2. That is to say, positional relationship of the pair of cameras 201 and 202, the inter-camera distance 204, and the size of the autostereoscopic 3D display 203, for example, are not limited to the above-described example. Moreover, the camera may be just a single camera, and the orientation and interpupillary distance of the user may be calculated based on an image captured by the camera and information (indicating whether the user is an adult or child, or indicating the interpupillary distance of the user, for example) received by an input unit (not shown in the drawings).

It is to be noted that the 3D tablet 100 shown in FIG. 1 corresponds to the 3D tablet 200 shown in FIG. 2. Moreover, the parallax image display unit 109 shown in FIG. 1 corresponds to the autostereoscopic 3D display 203 shown in FIG. 2. Furthermore, the user position detection unit 101 shown in FIG. 1 and the cameras 201 and 202 shown in FIG. 2 function as an obtaining unit which obtains the orientation of the user relative to the parallax image display unit 109 (autostereoscopic 3D display 203).

Next, the specific structure and operation of each structural element will be explained with reference to FIG. 4 through FIG. 19.

Figure 4:
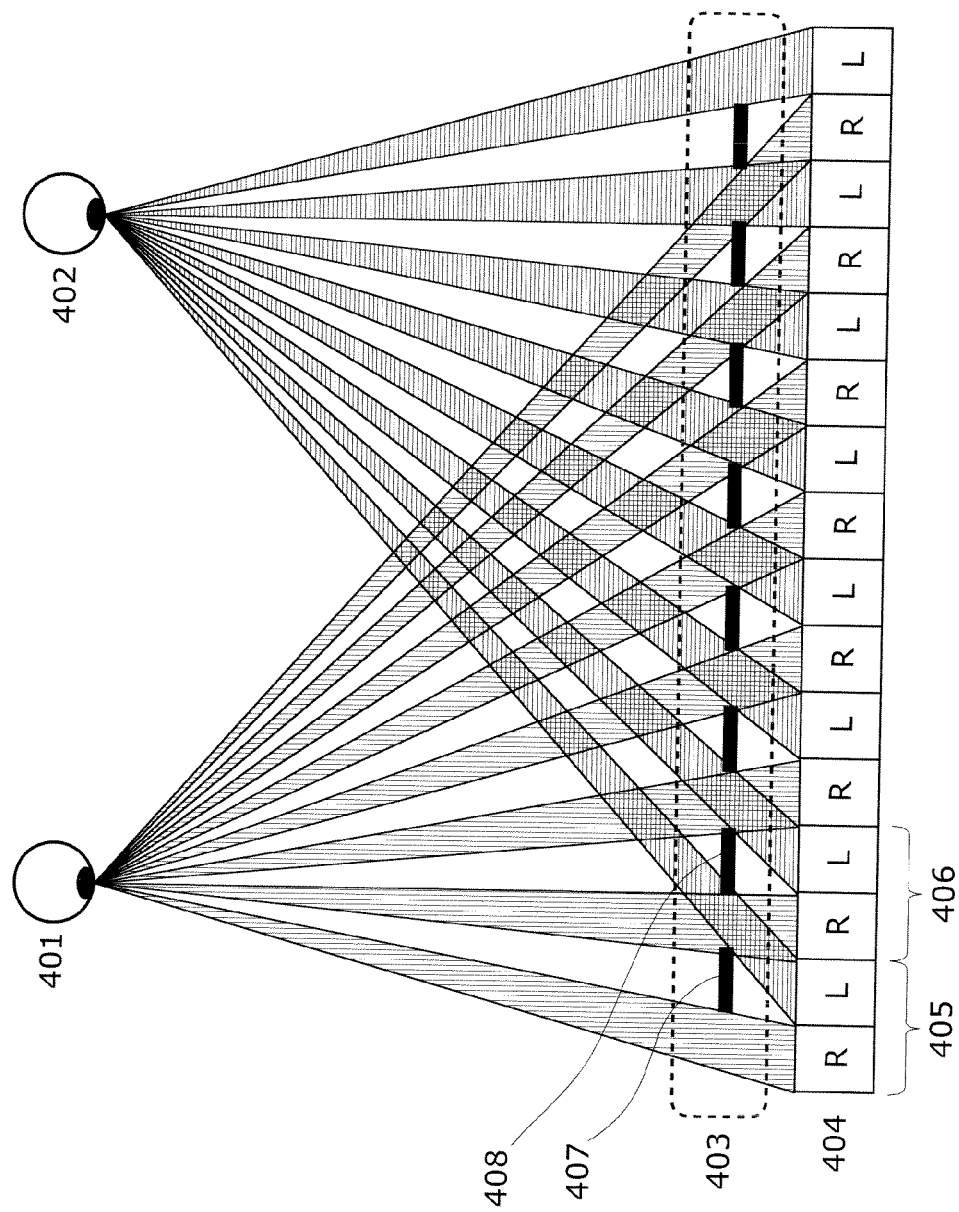
FIG. 4 illustrates a principle of parallax barrier stereoscopy.

First, the principle of parallax barrier autostereoscopy (the parallax barrier display unit 105 and the parallax image display unit 109) will be explained briefly with reference to FIG. 4. A display panel 404, which is equivalent to the parallax image display unit 109, is configured of a plurality of pixels capable of displaying each color in the RGB color space. Moreover, the plurality of pixels is a collection of pixel sets 405 and 406, each of which contain a right-eye pixel (R in FIG. 4, hereinafter referred to as R pixel) and a left-eye pixel (L in FIG. 4, hereinafter referred to as L pixel).

That is to say, the image (stereoscopic image) displayed on the display panel 404 is made up from a right-eye image configured of a plurality of right-eye pixels and a left-eye image configured of a plurality of left-eye pixels. Moreover, the right-eye image and the left-eye image are images which have mutual parallax.

A parallax barrier 403, which is equivalent to the parallax barrier display unit 105, is configured of a plurality of barriers 407, 408, and so on. In the example shown in FIG. 4, the barrier 407 corresponds to the pixel set 405, and the barrier 408 corresponds to the pixel set 406. That is to say, the pixel set 405, 406, and so on correspond on a one-to-one basis to the barrier 407, 408, and so on.

With this, a right eye 401 of the user is blocked from viewing the L pixels of the pixel set 405 and 406 by the barrier 407 and 408, and shown only the R pixels. Similarly, a left eye 402 of the user is blocked from viewing the R pixels of the pixel set 405 and 406 by the barrier 407 and 408, and shown only the L pixels.

With this method of parallax barrier autostereoscopy, the user is capable of stereoscopically viewing an image displayed on the display panel 404 since an image displayed by R pixels is shown to the right eye of the user and another image displayed by L pixels is shown to the left eye of the user.

Figure 5:
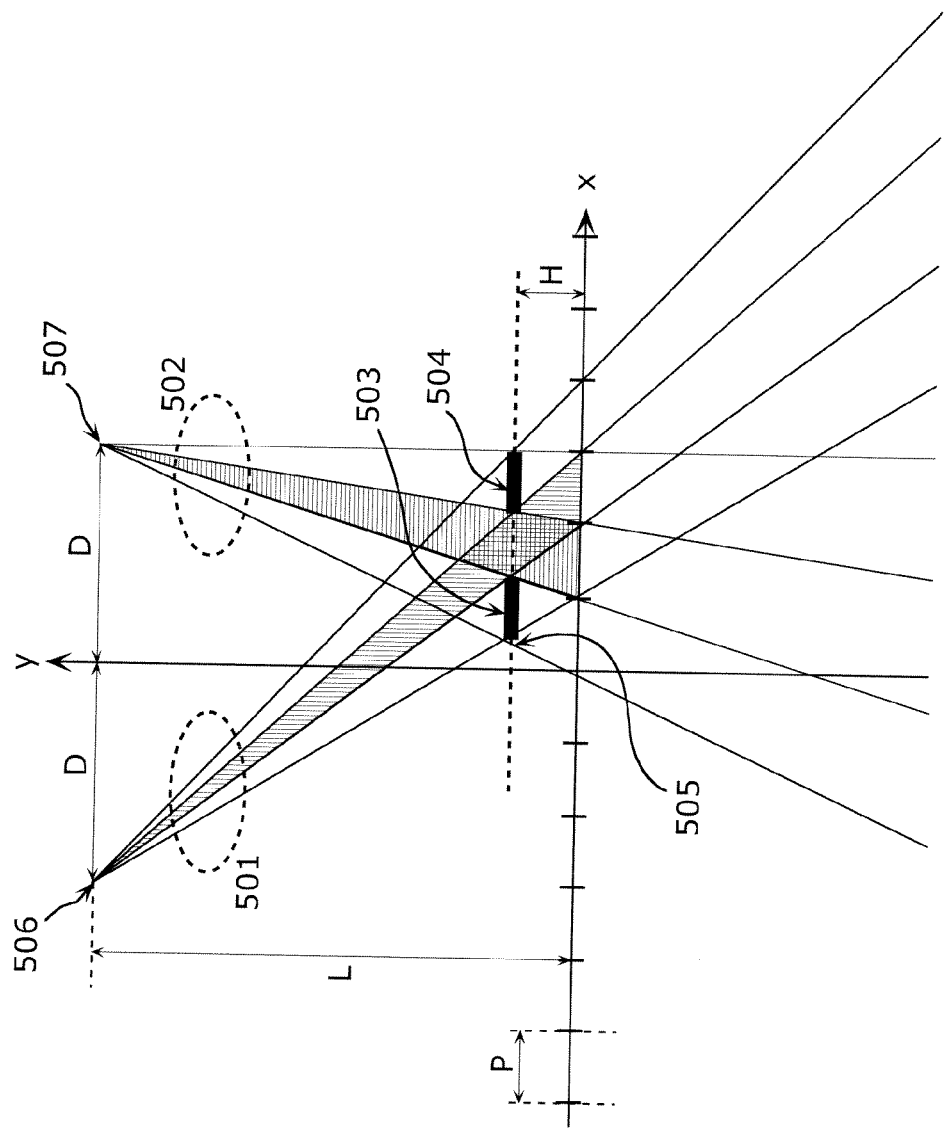
FIG. 5 illustrates a principle of parallax barrier design.
Figure 6:
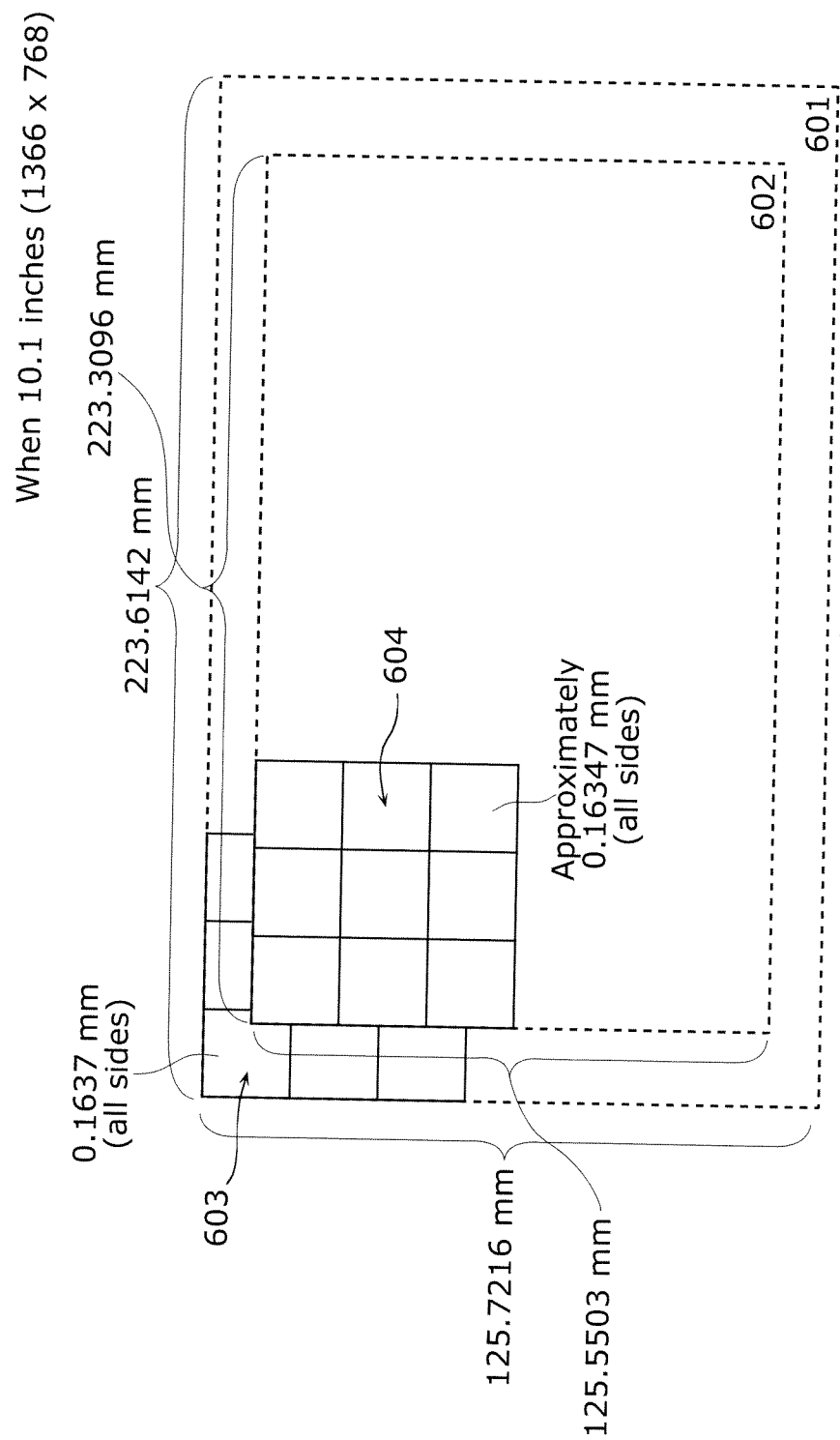
FIG. 6 illustrates the relative alignment of pixels and the parallax barrier.

FIG. 5 will be described in detail due to the importance of the parallax barrier configuration to the present disclosure.

As is shown in FIG. 5, the interpupillary distance between a right eye position 506 and a left eye position 507 of the user is defined as 2D, the viewing distance between the user and the display panel is defined as L, the pixel pitch is defined as P, and the clearance between the display panel and the parallax barrier is defined as H. The position of the parallax barrier 503 and 504, as well as the clearance H between the display panel and the parallax barrier can be calculated.

The group of lines connecting the coordinates of the left eye position 507 (D, L) and points attributed to discrete coordinates (nP, 0) (−683≤n≤683) along the x axis direction at intervals designated by the pixel pitch P are defined as the leftward straight line group 502. The group of lines connecting the coordinates of the right eye position 506 (−D, L) and points attributed to discrete coordinates (nP, 0) (−683≤n≤683) along the x axis direction at intervals designated by the pixel pitch P are defined as the rightward straight line group 501.

Each straight line included in the leftward straight line group 503 is represented by Equation 1. Equation 2 can be formed since the leftward straight line group 502 passes through the coordinates (D, L), and Equation 3 can be formed since the leftward straight line group 502 passes through the coordinates (nP, 0). Equation 4 is derived from Equations 2 and 3, and Equations 3 and 4 are inserted into Equation 1 to form Equation 5. Similarly, each straight line included in the rightward straight line group 501 is represented by Equation 6. Equation 7 is formed since the rightward straight line group 501 passes through the coordinates (−D, L), and Equation 8 is formed since the leftward straight line group 502 passes through the coordinates (nP, 0). Equation 9 is derived from Equations 7 and 8, and Equations 8 and 9 are inserted into Equation 6 to form Equation 10.

[Math 1]
$$y = ax + b \qquad \text{Equation 1}$$

[Math 2]
$$L = a \times D + b \, [y = L, x = D] \qquad \text{Equation 2}$$

[Math 3]
$$\left. \begin{array}{l} 0 = a \times nP + b \quad [y = 0, x = nP] \\ b = -anP \end{array} \right\} \qquad \text{Equation 3}$$

[Math 4]
$$\left. \begin{array}{l} L = aD - anP = a(D - nP) \\ a = \dfrac{L}{D - nP} \end{array} \right\} \qquad \text{Equation 4}$$

[Math 5]
$$y = \frac{L}{D - nP} x - anP = \frac{L}{D - nP} x - \frac{nPL}{D - nP} \qquad \text{Equation 5}$$

[Math 6]
$$y' = ax + b \qquad \text{Equation 6}$$

[Math 7]
$$L = -a \times D + b \, [y = L, x = -D] \qquad \text{Equation 7}$$

[Math 8]
$$\left. \begin{array}{l} 0 = a \times nP + b \quad [y = 0, x = nP] \\ b = -anP \end{array} \right\} \qquad \text{Equation 8}$$

[Math 9]
$$\left. \begin{array}{l} L = -aD - anP = -a(D + nP) \\ a = -\dfrac{L}{D + nP} \end{array} \right\} \qquad \text{Equation 9}$$

[Math 10]
$$y' = -\frac{L}{D + nP} x - anP = -\frac{L}{D + nP} x + \frac{nPL}{D + nP} \qquad \text{Equation 10}$$

Here, an intersection 505, which is the intersection of the leftward straight line group 502 and the rightward straight line group 501, represents the position of the parallax barrier.

That is to say, in order to calculate the intersection 505 for the parallax barrier, it is acceptable to find the intersection of a line from among the leftward straight line group 502 that passes through the coordinates (nP, 0) and a line from among the rightward straight line group 501 that passes through the coordinates ((n+1)P, 0). With this, Equation 11 is derived from Equations 5 and 10. Moreover, Equation 12 is derived from Equation 11.

[Math 11]

$$\frac{L}{D-nP}x - \frac{nPL}{D-nP} = -\frac{L}{D+(n+1)P}x + \frac{(n+1)PL}{D+(n+1)P} \quad \text{Equation 11}$$

[Math 12]

$$x = \frac{DP(2n+1)}{2D+P} \quad \text{Equation 12}$$

Equation 13 is formed by substituting Equation 12 for Equation 5. When n=0 in Equation 13, Equation 14 is calculated. That is to say, the clearance H between the display panel and the parallax barrier is determined by each of the following parameters: half of the interpupillary distance 2D (in other words, D), pixel pitch P, and viewing distance L.

[Math 13]

$$y = \frac{L}{D-nP}x - \frac{nPL}{D-nP} = \frac{L}{D-nP} \times \frac{DP(2n+1)}{2D+P} - \frac{nPL}{D-nP} \quad \text{Equation 13}$$

[Math 14]

$$\left. \begin{array}{l} H = \frac{L}{D} \times \frac{DP}{2D+P} \\ H = \frac{PL}{2D+P} \end{array} \right\} \quad \text{Equation 14}$$

Conversely, the viewing distance L can be found with Equation 15 when the clearance H between the display panel and the parallax barrier is fixed, such as in the case of calculating for goods already manufactured.

[Math 15]

$$L = \frac{H(2D+P)}{P} \quad \text{Equation 15}$$

All parameters for the parallax barrier can be calculated by setting them up as described above. It is to be noted that the parallax barrier according to this embodiment is configured from a liquid crystal matrix 602 in which each liquid crystal dot 604 can be switched between ON and OFF states, like that shown in FIG. 6.

Moreover, as parameters, it will be assumed that the display panel has a 1366×768 pixel resolution and a 10.1 inch LCD panel 601 (such as is the case in FIG. 6), and the user is at a viewing distance of 50 cm and has an interpupillary distance of 6 cm.

From this, the pixel pitch P of the LCD pixels 603 is 0.1673 mm, the width of one of the barriers in the parallax barrier is 0.16347 mm, and the clearance H between the display panel and the parallax barrier is 0.681 mm. Moreover, since one LCD pixel 603 corresponds to one liquid crystal dot 604, the center of the liquid crystal matrix 602 is aligned to match the center of the LCD panel 601.

As is shown in FIG. 7A and FIG. 7B, the parallax barrier is formed by switching a liquid crystal matrix 702 of the parallax barrier, which corresponds to an LCD panel 701, between ON and OFF states.

A pixel set in the LCD panel 701 shown in FIG. 7A is formed from a vertically adjacent R pixel (diagonal hatching) and L pixel (dot hatching). Moreover, the liquid crystal matrix 702 shown in FIG. 7B forms the parallax barrier by, at a position including the boundary of the pixel set, switching ON (shielding) a series of three pixels in a row, a series of the next two pixels one row down, a series of the next three pixels in one more row down, and so on. That is to say, FIG. 7B shows an example of a parallax barrier having stripes which extend in a top-left to bottom-right direction.

A pixel set in the LCD panel 801 shown in FIG. 8A is formed from a horizontally adjacent L pixel (dot hatching) and R pixel (diagonal hatching). Moreover, a liquid crystal matrix 802 shown in FIG. 8B forms the parallax barrier by, at a position including the boundary of the pixel set, switching ON (shielding) a series of three pixels in a column, a series of the next two pixels in one column to the left, a series of the next three pixels in one more column to the left, and so on. That is to say, FIG. 8B shows an example of a parallax barrier having stripes which extend in a top-right to bottom-left direction.

Figure 9A:
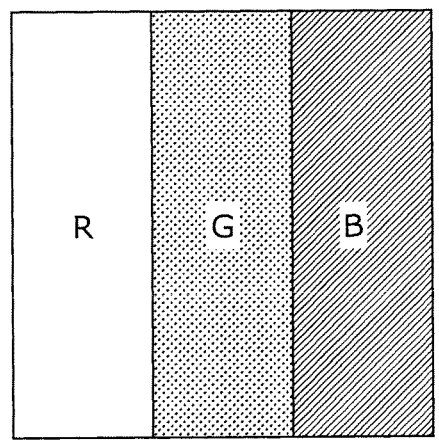
FIG. 9A is an example illustrating the alignment of a plurality of subpixels which constitute a pixel.

A typical LCD pixel is arranged in an RGB pattern, such as a pixel 901 shows in FIG. 9A. That is to say, the boundaries between the subpixels (three in this example; an R subpixel, a G subpixel, and a B subpixel) which make up the pixel 901 extend in a vertical direction. When the parallax barrier is formed above this kind of an RGB arrangement, a moiré pattern is likely to appear and cause the colors to separate.

Figure 9B:
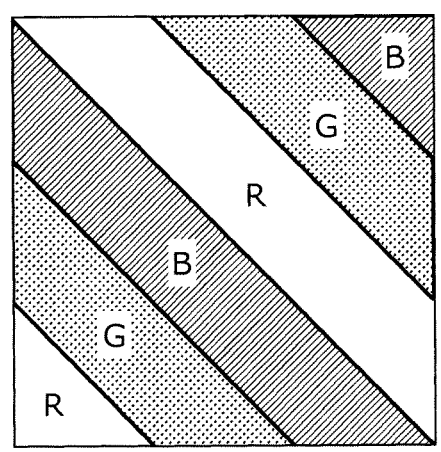
FIG. 9B is another example illustrating the alignment of a plurality of subpixels which constitute a pixel.

To reduce this effect, the RGB subpixels may be arranged in a diagonal manner, as is the case in a pixel 902 shown in FIG. 9B. That is to say, the boundaries between subpixels (R, G, and B) in the pixel 902 shown in FIG. 9B are diagonally aligned relative to the boundary of the pixel (that is, meet at acute angles). Furthermore, each subpixel shown in FIG. 9B is distributed in multiple positions (in this example, two positions) within the pixel 902.

Figure 10A:
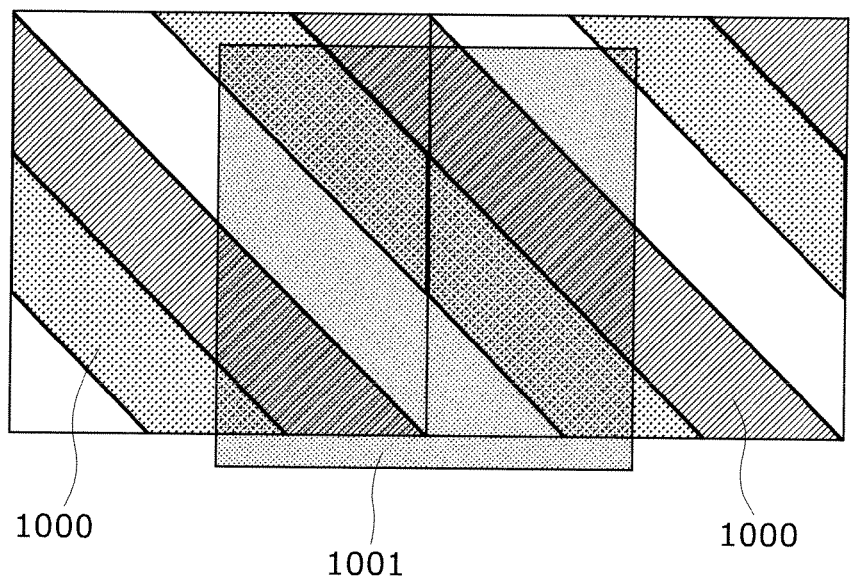
FIG. 10A is an example illustrating a relationship between pixels having diagonally aligned subpixels and the parallax barrier.
Figure 10B:
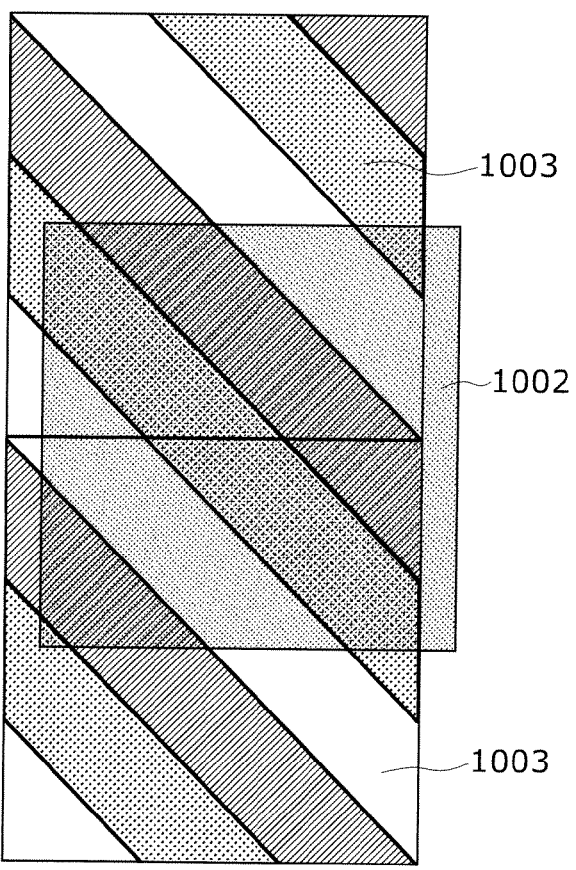
FIG. 10B is another example illustrating a relationship between pixels having diagonally aligned subpixels and the parallax barrier.

FIG. 10A and FIG. 10B illustrate the relationship between the pixels having diagonally aligned subpixels and the parallax barrier. As is shown in FIG. 10A and FIG. 10B, all of the subpixels (R, G, and B) of the LCD pixels 1000 and 1003 are visible even when the liquid crystal dots 1001 and 1002 of the parallax barrier are superimposed thereon. As a result, a moiré pattern can be kept from appearing.

Figure 11:
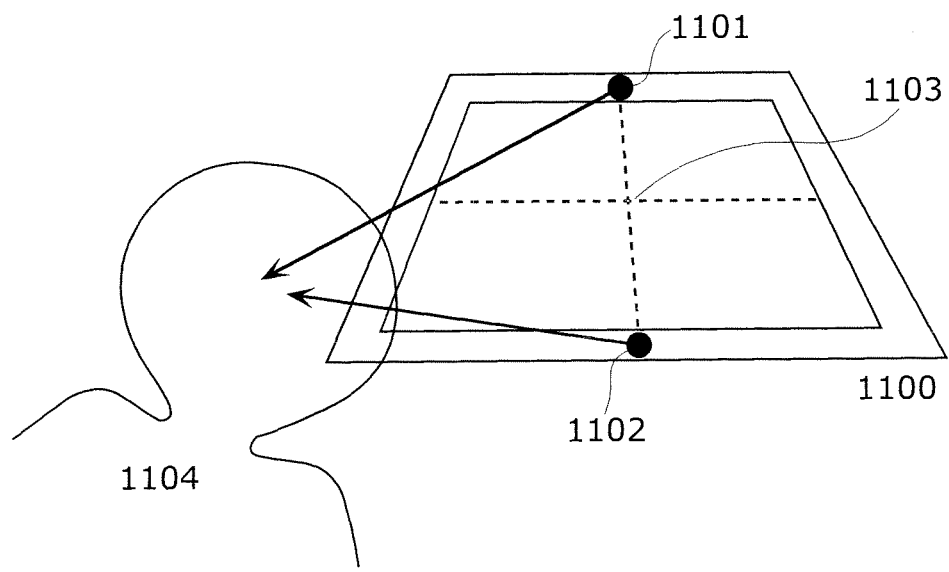
FIG. 11 illustrates a user eye detection method using a stereo camera.

Next, a method for detecting the position of the user (the operations of the user position detection unit 101 and the direction calculation and control unit 103) is described with reference to FIG. 11 through FIG. 13. A 3D tablet 1100 includes a pair of cameras 1101 and 1102 which capture an image of a user 1104 viewing a stereoscopic image being displayed on the 3D tablet 1100.

Figure 12A:
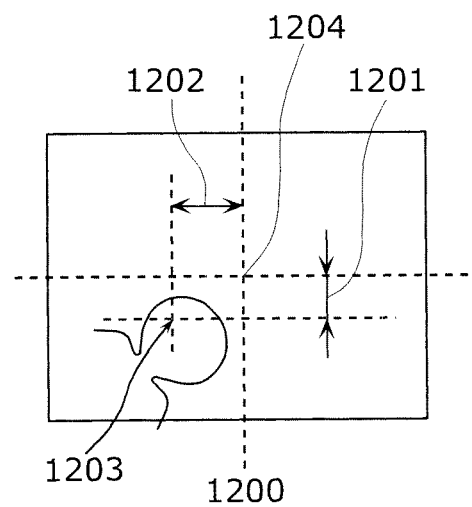
FIG. 12A is an example of an image captured by one of the cameras in the stereo camera.
Figure 12B:
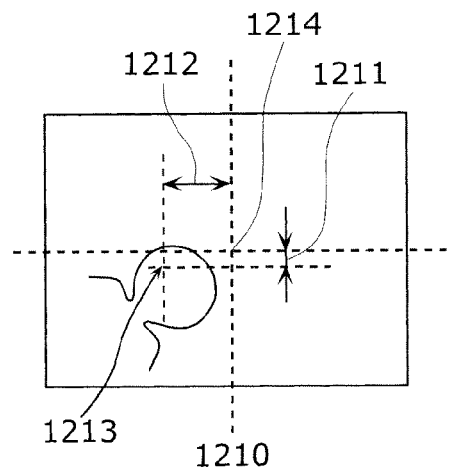
FIG. 12B is an example of an image captured by the other of the cameras in the stereo camera.

An image 1200 shown in FIG. 12A is captured by the camera 1101, and an image 1210 shown in FIG. 12B is captured by the camera 1102. The user's right and left eyes are sampled by processing each of the images 1200 and 1210. The processing method does not need to be a particular method. For example, a shape recognition algorithm may be used to detect a portion thought to be an eye, and that portion may be sampled. From the samples, pixel distances (1201, 1202) and (1211, 1212), which are distances from the center point 1204 and 1214 of each image to the left eye 1203 and 1213 in each image, are calculated. Similarly, the pixel distance from the center point of the image to the right eye of the user is calculated for each image.

Figure 13:
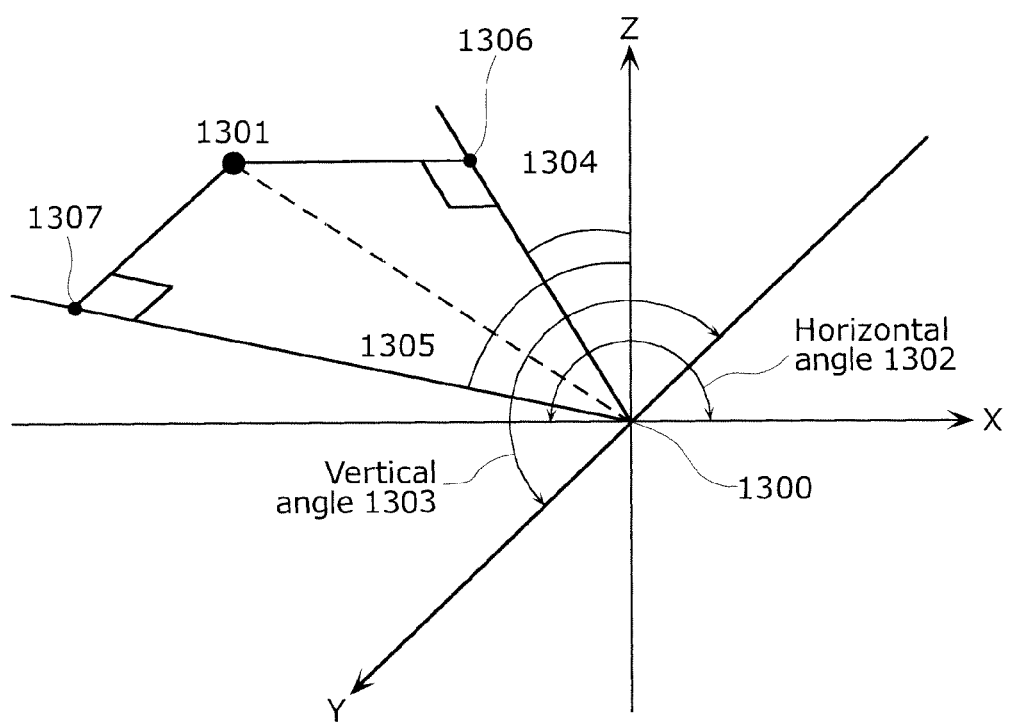
FIG. 13 illustrates the vertical angle and the horizontal angle within an image captured by a camera.
Figure 14:
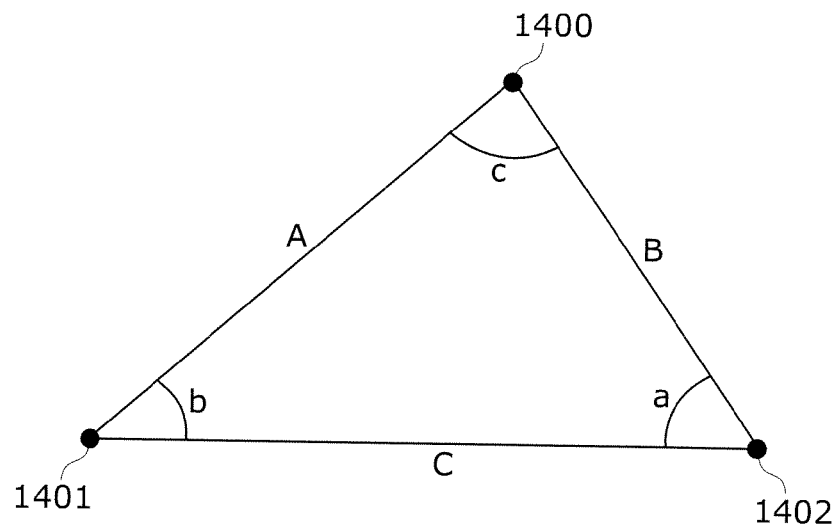
FIG. 14 illustrates the law of cosines.

By calibrating the cameras 1101 and 1102 beforehand, the characteristics of each of the cameras can be obtained, and, as is shown in FIG. 13, the direction from a camera position 1300 (positions of the cameras 1101, 1102) to a target 1301 (right or left eye) can be calculated by offsetting the calculated pixel distances.

In this way, the heightwise direction of the images shown in FIG. 12A and FIG. 12B correspond to a vertical angle 1303 which is an angle corresponding to the Y axis in FIG. 13, and the lengthwise direction of the images shown in FIG. 12A and FIG. 12B correspond to a horizontal angle 1302 which is an angle corresponding to the X axis in FIG. 13. Moreover, the vertical direction in the images shown in FIG. 12A and FIG. 12B (a depthwise direction relative to the surface plane of the image, extending from the depths of the image to the front) corresponds to the z axis in FIG. 13. With this, the direction (angle) extending from the camera position 1300 (position of the cameras 1101 and 1102) to the target 1301 (left or right eye) can be calculated with the pixel distance. That is to say, a target vertical angle 1304 can be found from the pixel distance 1201, and a target horizontal angle 1305 can be found from the pixel distance 1202.

It is to be noted that the target vertical angle 1304 is an angle between the z axis and a line which connects the camera position 1300 and the intersection 1306 at which the y-z plane and a line from the target 1301 perpendicular to the y-z plane meet. Similarly, the target horizontal angle 1305 is an angle between the z axis and a line which connects the camera position 1300 and the intersection 1307 at which the z-x plane and a line from the target 1301 perpendicular to the z-x plane meet.

Here, a triangulation method, for example, is used to calculate the spatial location coordinates for the target 1301. The law of cosines shown in Equation 16 relates the sides A through C to the angles a through c shown in FIG. 14.

[Math 16]

$$\frac{A}{\sin(a)} = \frac{B}{\sin(b)} = \frac{C}{\sin(c)} \qquad \text{Equation 16}$$

When an apex 1401 represents the position of the camera 1101, an apex 1402 represents the position of the camera 1102, an apex 1400 represents the intersection at which the y-z plane and a line from the target 1301 perpendicular to the y-z plane meet, side C is equivalent to the distance between the camera 1101 and the camera 1102. It is to be noted that the angle a and the angle b can be calculated from the previously stated target vertical angle 1304. Furthermore, the angle c can be calculated from the angles a and b. Therefore, with Equations 17 and 18, the length of the sides A and B, that is to say, the distances between the intersection at which the y-z plane and a perpendicular line from the target 1301 meet and each of the cameras 1101 and 1102 can be found. With Equations 19 and 20, the y coordinates and z coordinates for the target 1301 can be found. Moreover, when the target horizontal angle 1305 is input as d, the x coordinates of the target 1301 can be found with Equation 21.

[Math 17]

$$A = C \times \frac{\sin(a)}{\sin(c)} \qquad \text{Equation 17}$$

[Math 18]

$$B = C \times \frac{\sin(b)}{\sin(c)} \qquad \text{Equaton 18}$$

[Math 19]

$$z = A \times \sin(a) \qquad \text{Equation 19}$$

[Math 20]

$$y = A \times \cos(a) \qquad \text{Equation 20}$$

[Math 21]

$$x = z \times \tan(d) \qquad \text{Equation 21}$$

Since the spatial location coordinates for the target 1301 can be found with the above Equations, the spatial location coordinates for the right and left eyes can be found in a similar manner.

Figure 15:
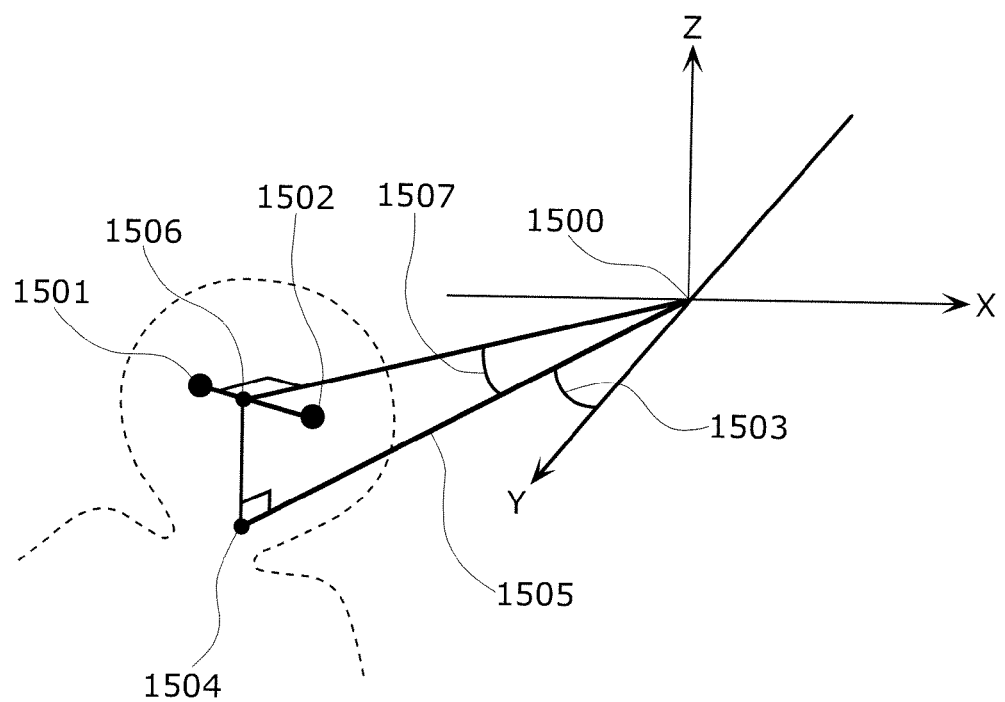
FIG. 15 illustrates the viewing orientation of the user.

Next, calculation method for the target angle will be described. The target angle is an angle between the y axis and a line which connects the origin of the coordinate space and an intersection of the x-y plane and a line perpendicular to the x-y plane extending from the midpoint of a line segment connecting the right and left eyes. Specifically, as is shown in FIG. 15, spatial location coordinates 1506 ((xr+xl)/2, (yr+yl)/2, (zr+zl)/2) of a midpoint of a line segment connecting the right and left eyes are calculated from the obtained right eye spatial location coordinates 1502 (xr, yr, zr) and left eye spatial location coordinates 1501 (xl, yl, zl). Then, a target angle 1503 (R), which is an angle between the y axis and a line segment 1505 which connects an origin 1500 and an intersection 1504 of the x-y plane and a vertical line extending from the spatial location coordinates 1506 toward the x-y plane, is found using Equation 22.

[Math 22]

$$R = \tan^{-1}\left(\frac{xr + xl}{yr + yl}\right) \qquad \text{Equation 22}$$

The orientation of the parallax barrier and the parallax direction of the stereoscopic image can be changed as is shown in FIG. 3A and FIG. 3B using this target angle 1503. In FIG. 3A and FIG. 3B, the arrows 301 and 305 representing the orientation of the user are supplied as the target angle 1503. The parallax barriers 304 and 308 are controlled to collimate with this direction. Moreover, the set of the left-eye image 302 and the right-eye image 303, as well as the set of the left-eye image 306 and the right-eye image 307 are controlled such that the parallax between them is generated in a direction perpendicular to the target angle 1503.

It is to be noted that an angle 1507 (T) between the line segment 1505 and the line segment connecting the origin 1500 and the spatial location coordinates 1506 of the midpoint of the line segment connecting the right and left eyes may be found using Equation 23.

[Math 23]

$$T = \tan^{-1}\left\{\frac{\left(\frac{zr+zl}{2}\right)}{\sqrt{\left(\frac{xr+xl}{2}\right)^2 + \left(\frac{yr+yl}{2}\right)^2}}\right\}$$ Equation 23

The content displayed on the autostereoscopic 3D display 203 may be adjusted according to the angle 1507. For example, the reality of the content displayed on the autostereoscopic 3D display 203 can be enhanced by adjusting the content in accordance with the direction of the target vertical angle, to an image seen from this angle. Furthermore, it is possible to provide a user interface which changes depending on the viewing angle by adjusting the menu, for example, to be in agreement with the direction of the target vertical angle.

The angle 1507 in FIG. 15 is an angle (angle of elevation) between the line of sight of the user and the plane (x-y plane) including the autostereoscopic 3D 203 (parallax image display unit 109). Objects are stereoscopically displayed on the autostereoscopic 3D display 203 according to this angle of elevation. That is to say, a stereoscopic image of an object as observed from a direction indicated by the angle of elevation is displayed on the autostereoscopic 3D display 203.

More specifically, when the angle of elevation is 90 degrees (user is viewing from the z axis direction), for example, a stereoscopic image of an object as observed from the front is shown on the autostereoscopic 3D display 203. On the other hand, when the angle of elevation is 45 degrees, a stereoscopic image of an object as observed from an angle of 45 degrees is displayed on the autostereoscopic 3D display 203.

Figure 16:
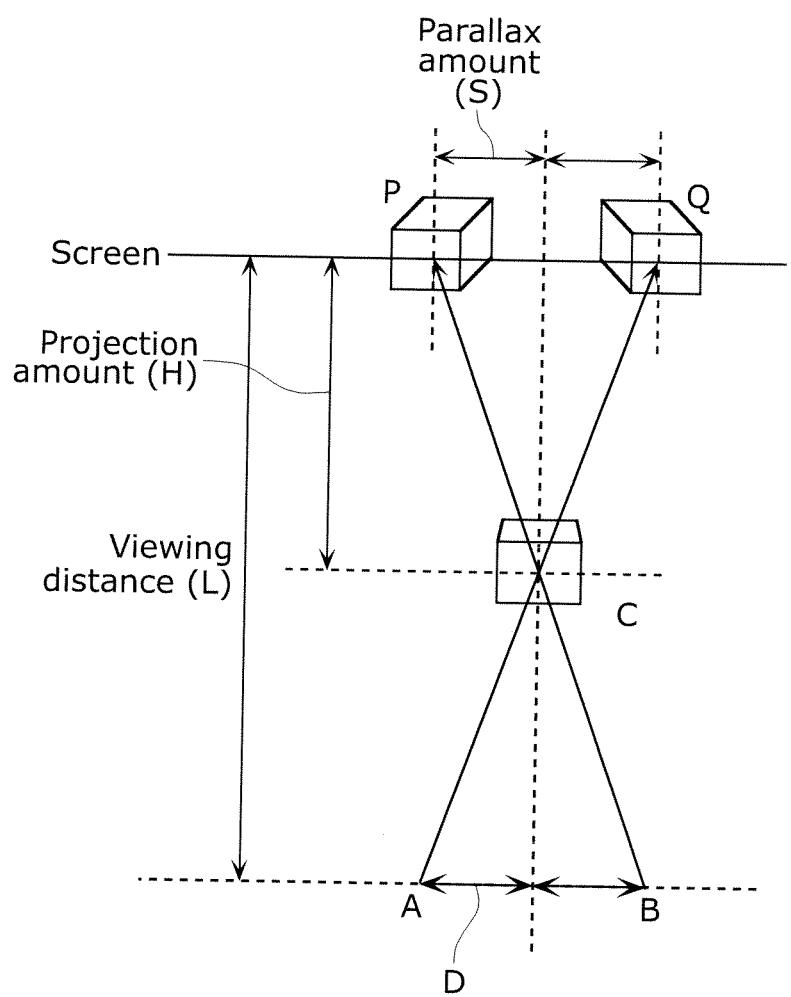
FIG. 16 illustrates a parallax amount for a projecting stereoscopic object.
Figure 17:
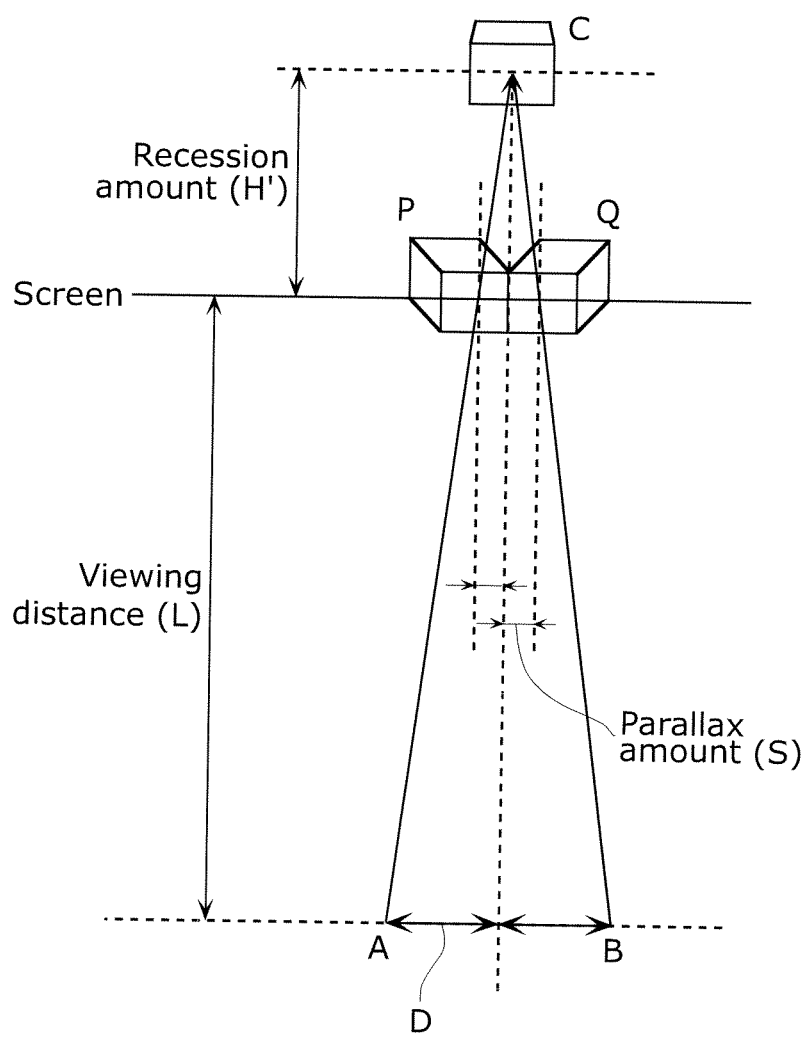
FIG. 17 illustrates a parallax amount for a receding stereoscopic object.

Next, left and right parallax images are generated using the projection amount (H) or the recession amount (H') of the stereoscopic image displayed, the interpupillary distance (D), and the viewing distance (L). Specifically, as is shown in FIG. 16 and FIG. 17, a parallax image P and a parallax image Q are rendered using a graphic library such as OpenGL (Registered Trademark) to display a stereoscopic object C as observed from a viewing position A and a viewing position B. For a projecting stereoscopic object, Equation 24 is used, and for a receding stereoscopic object, Equation 25 is used to calculate a parallax amount S.

[Math 24]

$$S = \frac{D \times H}{L - H}$$ Equation 24

[Math 25]

$$S = \frac{D \times H'}{L + H'}$$ Equation 25

The parallax image P and the parallax image Q are rendered offset to the right and left using the parallax amount S as an on-screen offset from the intersection of the screen and a straight line drawn vertical to the screen and passing through a midpoint between the viewing position A and the viewing position B. It is to be noted that the parallax amount S is a continuous value, while the pixel pitch of the autostereoscopic 3D display 203 is a fixed value. Therefore, the pixel pitch of the autostereoscopic 3D display 203 is taken into consideration when the rendering position of the parallax image P and the parallax image Q is determined. At this time, the parallax amount S is set in a direction perpendicular to the direction determined by the target angle, as is shown in FIG. 3A and FIG. 3B.

Figure 18:
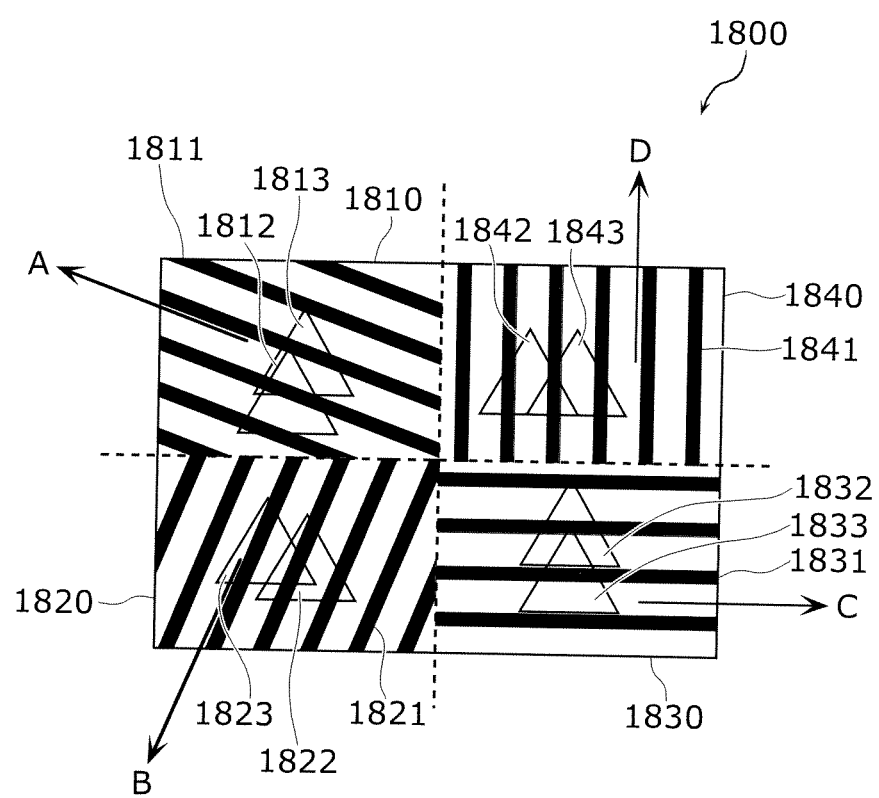
FIG. 18 is an example illustrating a display divided into multiple display regions.

It is to be noted that a plurality of people may be detected by the user position detection unit 101, and orientation information 104 may be calculated for each person by the direction calculation and control unit 103. In the parallax barrier display unit 105, the parallax image generation unit 107, and the parallax image display unit 109, the display of a 3D tablet 1800 may be divided up into display regions 1810, 1820, 1830, and 1840 corresponding to users A, B, C, and D, respectively, and a stereoscopic image may be displayed in each of the regions, as is shown in FIG. 18.

Specifically, the user position detection unit 101 and the direction calculation and control unit 103 shown in FIG. 1 obtain orientations of the users A through D (the arrows in FIG. 18), each of which correspond to one of the display regions 1810 through 1840. The parallax barrier display unit 105 then substantially collimates the direction of the stripes of the parallax barrier for each of the display regions 1810 through 1840 with the orientation of a corresponding user. Moreover, the parallax image generation unit 107 generates, for each of the display regions 1810 through 1840, a stereoscopic image in which there is parallax in a direction substantially perpendicular to the orientation of each of the users, and displays the result on the parallax image display unit 109.

As a result, on the display region 1810 corresponding to the user A, a parallax barrier 1811 having stripes which extend in a top-left to bottom-right direction is superimposed, and a right-eye image 1812 and a left-eye image 1813 which have been shifted to the bottom left and to the top right are displayed.

Moreover, on the display region 1820 corresponding to the user B, a parallax barrier 1821 having stripes which extend in a top-right to bottom-left direction is superimposed, and a right-eye image 1822 and a left-eye image 1823 which have been shifted to the top left and to the bottom right are displayed.

Moreover, on the display region 1830 corresponding to the user C, a parallax barrier 1831 having stripes which extend in a horizontal direction is superimposed, and a right-eye image 1832 and a left-eye image 1833 which have been shifted vertically are displayed.

Furthermore, on the display region 1840 corresponding to the user D, a parallax barrier 1841 having stripes which extend in a vertical direction is superimposed, and a right-eye image 1842 and a left-eye image 1843 which have been shifted horizontally are displayed.

Figure 19:
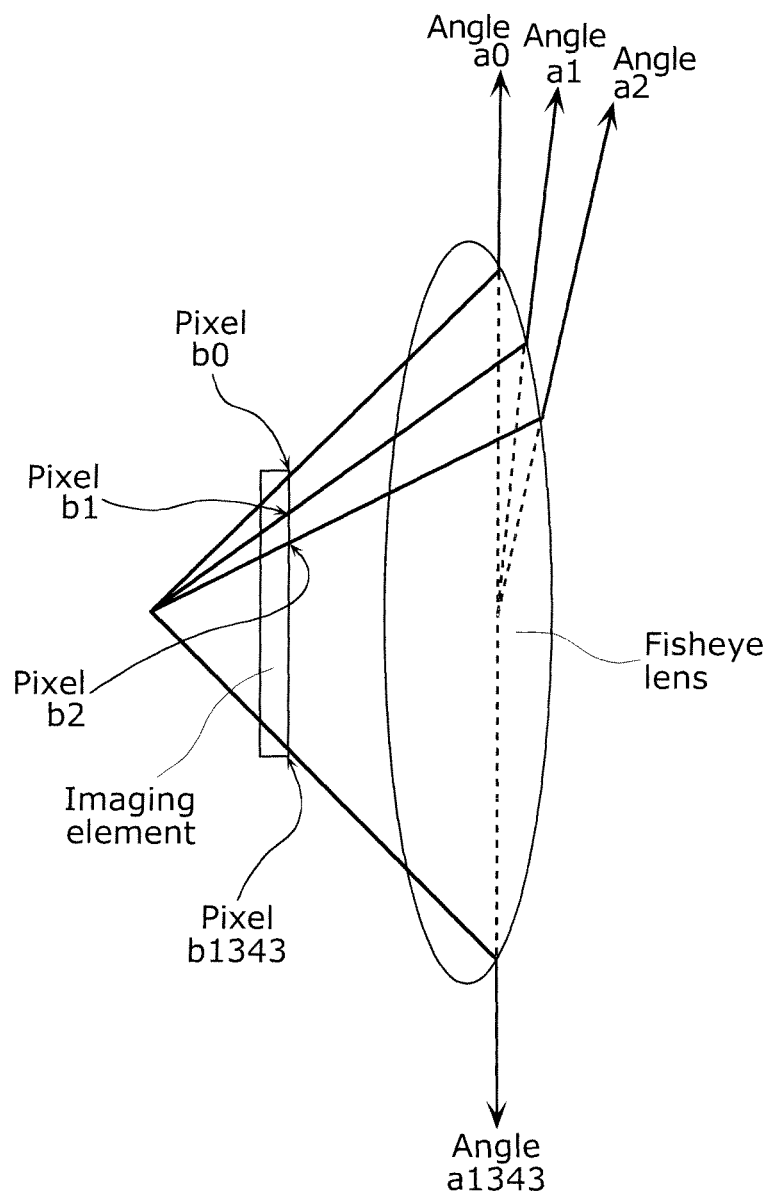
FIG. 19 illustrates a relationship between imaging element pixels and an angle of view of a camera.

Next, the relationship between the angles of view of the pair of cameras and the pixels of the imaging elements which are built into the pair of cameras and which obtain each image will be described with reference to FIG. 19. A lens is aligned in front of the imaging element of each of the pair of cameras and the angle of view thereof is determined by the relationship of the imaging element and the lens. For example, if the number of pixels of the imaging element in the horizontal direction is 1344 (b0 to b1343) and the lens is a fisheye lens, the angle of view that can be captured is 180 degrees (degree a0 to degree a1343). When this is the case, each image can be obtained at a resolution of the degree ($180/1344$) per pixel in the horizontal direction of the imaging element.

It is to be noted that a means for actively detecting the viewing position of the user, such as a camera, is not required to be provided. The user may, for example, input their position relative to the 3D tablet. When the LCD of the 3D tablet is provided with a touch panel, the position of the user can be input into the 3D tablet by the user tapping an area of the LCD near him or herself. Moreover, when the LCD of the 3D tablet is not provided with a touch panel, the position of the user can be input into the 3D tablet by the user indicating an area of the LCD near him or herself with an existing pointing means, such as a curser, mouse, or trackball.

Although only one embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

When applied to a large-scale device, the stereoscopic image display device according to the present disclosure provides the advantageous effect of allowing an image be viewed stereoscopically from any angle when placed flat on a table, and as such, is useful in large-scale 3D tablets, for example.

The invention claimed is:

1. A stereoscopic image display device comprising:
    a display unit configured to display a stereoscopic image including a right-eye image and a left-eye image, between which there is parallax;
    a parallax barrier having a stripe pattern and superimposed on the display unit to show the right-eye image to a right eye of a user and the left-eye image to a left eye of the user;
    an obtaining unit configured to obtain an orientation of the user which is a direction of a virtual line in a surface including the display unit, the virtual line connecting the user and the display unit;
    a control unit configured to substantially collimate a longitudinal direction of the stripe pattern of the parallax barrier with the orientation of the user obtained by the obtaining unit by adjusting the longitudinal direction of the stripe pattern of the parallax barrier in a surface parallel to the surface including the display unit according to the orientation of the user; and
    a generation unit configured to generate and display, using the display unit, the stereoscopic image including the right-eye image and the left-eye image, between which there is parallax in a direction substantially perpendicular to the orientation of the user obtained by the obtaining unit.

2. A stereoscopic image display device comprising:
    a display unit configured to display a stereoscopic image including a right-eye image and a left-eye image, between which there is parallax;
    a parallax barrier having a stripe pattern and superimposed on the display unit to show the right-eye image to a right eye of a user and the left-eye image to a left eye of the user;
    an obtaining unit configured to obtain an orientation of the user which is a direction of a virtual line in a surface including the display unit, the virtual line connecting the user and the display unit;
    a control unit configured to substantially collimate a longitudinal direction of the stripe pattern of the parallax barrier with the orientation of the user obtained by the obtaining unit by adjusting the longitudinal direction of the stripe pattern of the parallax barrier in a surface parallel to the surface including the display unit according to the orientation of the user; and
    a generation unit configured to generate and display, using the display unit, the stereoscopic image including the right-eye image and the left-eye image, between which there is parallax in a direction substantially perpendicular to the longitudinal direction of the stripe pattern of the parallax barrier substantially collimated to the orientation of the user by the control unit.

3. The stereoscopic image display device according to claim 1,
    wherein the obtaining unit is further configured to obtain an interpupillary distance of the user, and
    the generation unit is configured to adjust an amount of parallax between the right-eye image and the left-eye image according to the interpupillary distance obtained by the obtaining unit.

4. The stereoscopic image display device according to claim 1,
    wherein the obtaining unit includes an image capturing unit configured to capture an image of the user, and
    the obtaining unit is configured to derive the orientation of the user from the image captured by the image capturing unit.

5. The stereoscopic image display device according to claim 1,
    wherein the obtaining unit further includes an input unit configured to receive an input of information specifying a position of the user, and
    the obtaining unit is configured to derive the orientation of the user based on the information received by the input unit.

6. The stereoscopic image display device according to claim 1,
    wherein each pixel of the display unit includes a plurality of subpixels, and
    boundaries between the subpixels extend in a diagonal direction relative to boundaries between adjacent ones of the pixels.

7. The stereoscopic image display device according to claim 1,
    wherein the display unit includes a plurality of display regions,
    the obtaining unit is configured to obtain the orientation of the user relative to each of the display regions,
    the control unit is configured to substantially collimate the longitudinal direction of the stripe pattern of the parallax barrier for each of the display regions with the orientation of the user, and
    the generation unit is configured to generate and display, for each of the display regions, the stereoscopic image including the right-eye image and the left-eye image, between which there is parallax in a direction substantially perpendicular to the orientation of the user obtained by the obtaining unit.

8. The stereoscopic image display device according to claim 1,
    wherein the obtaining unit is further configured to obtain an angle of elevation of the user with respect to a display surface of the display unit, and
    the generation unit is configured to generate and display, using the display unit, the stereoscopic image of an object as observed from the angle of elevation of the user obtained by the obtaining unit.

9. A method of displaying a stereoscopic image on a stereoscopic image display device including a display unit configured to display the stereoscopic image including a right-eye image and a left-eye image, between which there is parallax, and a parallax barrier having a stripe pattern and superimposed on the display unit to show the right-eye image to a right eye of a user and the left-eye image to a left eye of the user, the method comprising:
  obtaining an orientation of the user which is a direction of a virtual line in a surface including the display unit, the virtual line connecting the user and the display unit;
  substantially collimating a longitudinal direction of the stripe pattern of the parallax barrier with the orientation of the user obtained in the obtaining by adjusting the longitudinal direction of the stripe pattern of the parallax barrier in a surface parallel to the surface including the display unit according to the orientation of the user; and
  generating and displaying, using the display unit, the stereoscopic image including the right-eye image and the left-eye image, between which there is parallax in a direction substantially perpendicular to the orientation of the user obtained in the obtaining.

10. A method of displaying a stereoscopic image on a stereoscopic image display device including a display unit configured to display the stereoscopic image including a right-eye image and a left-eye image, between which there is parallax, and a parallax barrier having a stripe pattern and superimposed on the display unit to show the right-eye image to a right eye of a user and the left-eye image to a left eye of the user, the method comprising:
  obtaining an orientation of the user which is a direction of a virtual line in a surface including the display unit, the virtual line connecting the user and the display unit;
  substantially collimating a longitudinal direction of the stripe pattern of the parallax barrier with the orientation of the user obtained in the obtaining by adjusting the longitudinal direction of the stripe pattern of the parallax barrier in a surface parallel to the surface including the display unit according to the orientation of the user; and
  generating and displaying, using the display unit, the stereoscopic image including the right-eye image and the left-eye image, between which there is parallax in a direction substantially perpendicular to the longitudinal direction of the stripe pattern of the parallax barrier substantially collimated to the orientation of the user in the substantially collimating.

* * * * *